(No Model.) 2 Sheets—Sheet 1.
H. R. BOTHWELL & J. H. STRUGNELL.
STOCK CAR.
No. 269,629. Patented Dec. 26, 1882.
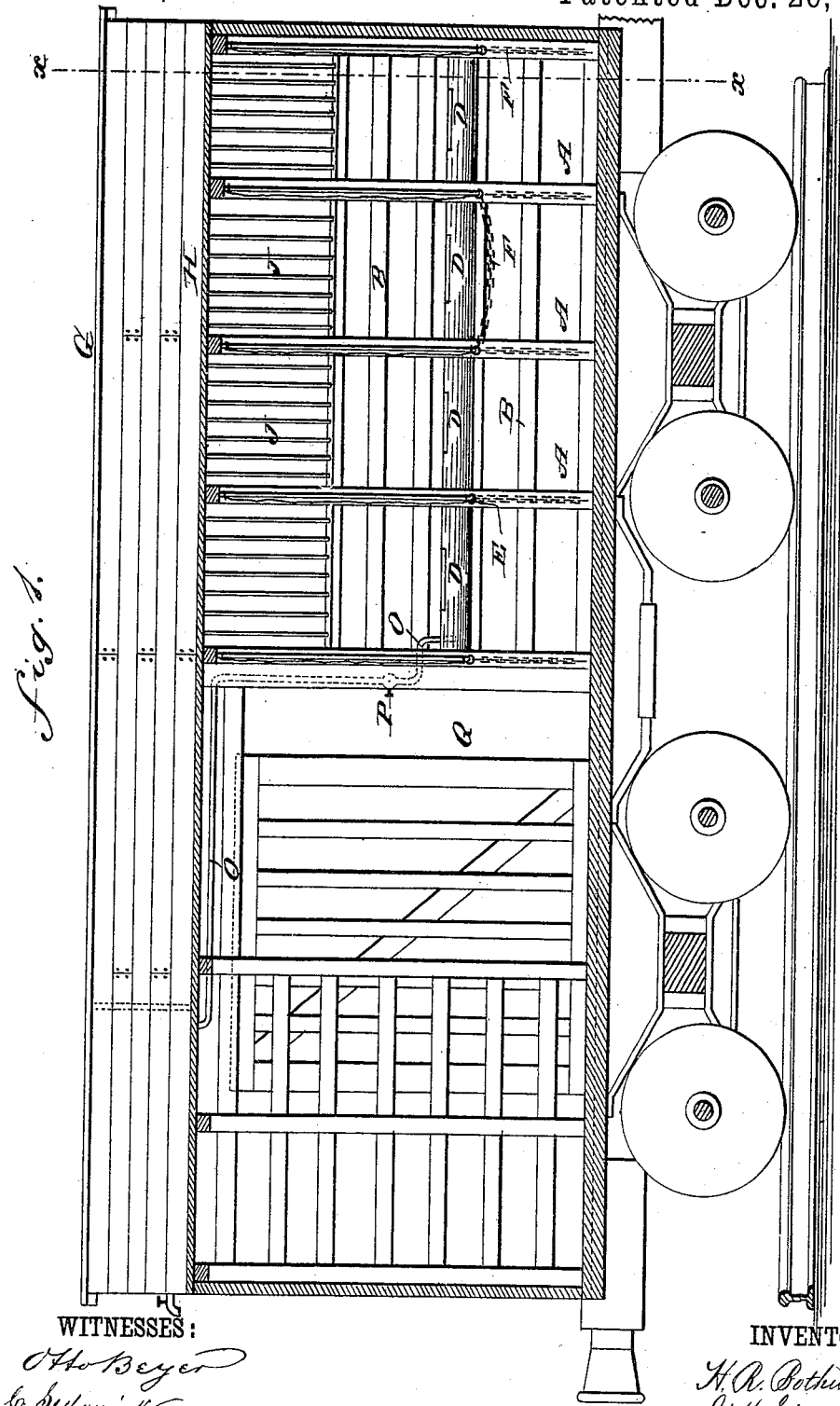
WITNESSES:
Otto Beyer
C. Sedgwick
INVENTOR:
H. R. Bothwell
J. H. Strugnell
BY Munn & Co.
ATTORNEYS.
N. PETERS, Photo-Lithographer, Washington, D. C.

(No Model.) 2 Sheets—Sheet 2.
H. R. BOTHWELL & J. H. STRUGNELL.
STOCK CAR.
No. 269,629. Patented Dec. 26, 1882.
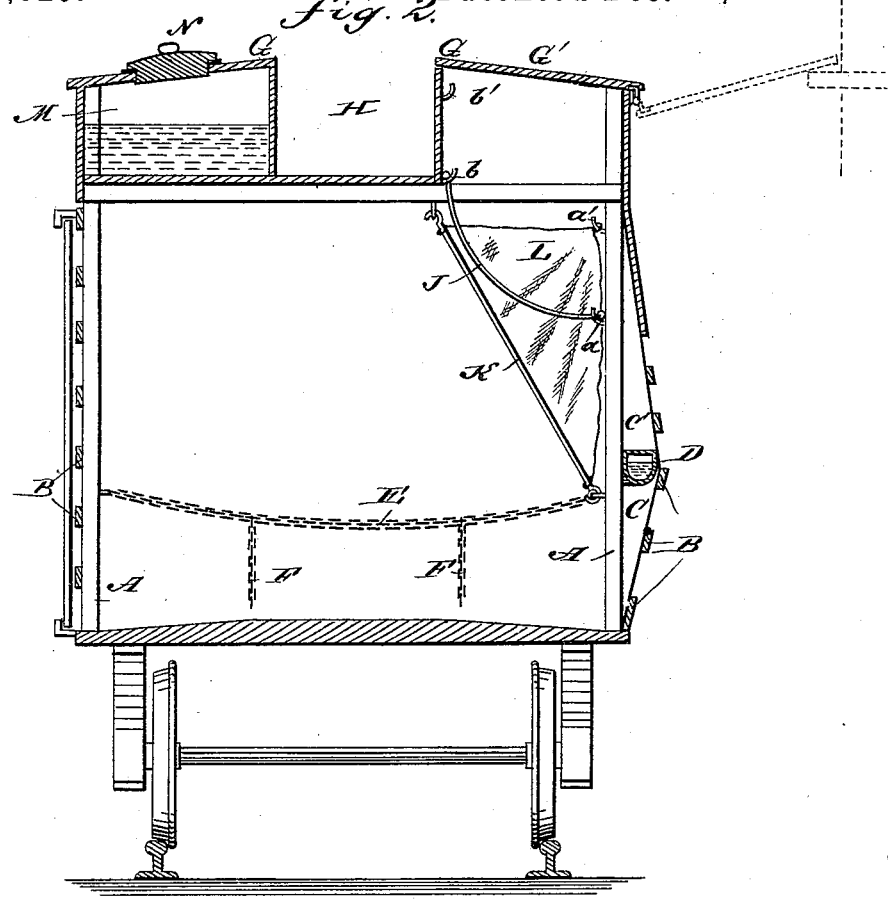
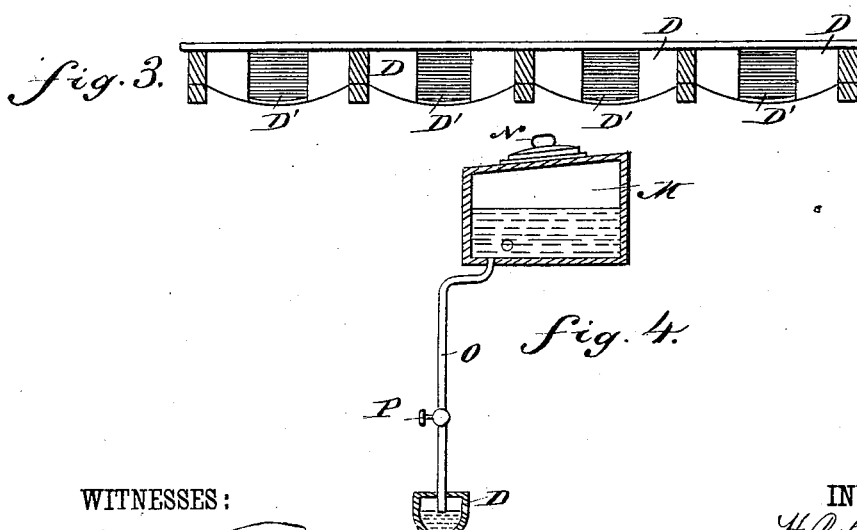
WITNESSES:
Otto Beyer
C. Sedgwick
INVENTOR:
H. R. Bothwell
J. H. Strugnell
BY Munn & Co
ATTORNEYS.

UNITED STATES PATENT OFFICE.

HENRY R. BOTHWELL AND JAMES H. STRUGNELL, OF TORONTO, ONTARIO, CANADA.

STOCK-CAR.

SPECIFICATION forming part of Letters Patent No. 269,629, dated December 26, 1882.

Application filed August 28, 1882. (No model.)

*To all whom it may concern:*

Be it known that we, HENRY RICHARDSON BOTHWELL and JAMES HUDD STRUGNELL, both of Toronto, in the Province of Ontario and Dominion of Canada, have invented a new and Improved Stock-Car, of which the following is a full, clear, and exact description.

The object of our invention is to provide a new and improved car for transporting cattle, in which car the animals can be fed and watered very easily and rapidly, and in which they can be transported without being subjected to the inclemencies of the weather and without suffering, as in the usual cattle-cars in use heretofore.

The invention consists in chains attached to the opposite standards of the car, and provided with pieces of chain which can be attached to the adjoining transverse chains for forming supports under the bellies of the animals to prevent them from lying down.

The invention further consists in the combination, with manger-bars, of a series of hooks on the standards and on the walls of the hay-boxes, for the purpose of facilitating the adjustment of the mangers to the size of the animals.

The invention also consists in a diagonal bar attached to the ceiling of the car and to one of the sides, to which bar a piece of canvas is attached, which is also attached to the ceiling and side of the car, and forms a partition at the head end of the stalls.

Reference is to be had to the accompanying drawings, forming part of this specification, in which similar letters of reference indicate corresponding parts in all the figures.

Figure 1 is a longitudinal sectional elevation of our improved cattle-car. Fig. 2 is a cross-sectional elevation of the same on the line *x x*, Fig. 1. Fig. 3 is a sectional plan view of the troughs. Fig. 4 is a detail sectional view of the tank, trough, and water-conducting pipe.

The car is supported in the usual manner by wheels and trucks. The car is provided with sides formed of standards A, to which the horizontal slats B are attached in the usual manner. Half of the animals have their heads at the half of one side of the car, and the other half of the animals have their heads at the opposite half of the opposite side of the car, so that half of the animals will stand in one direction and the other half in the other direction. That half of each side of the car at which the animals' heads are must be provided with a trough, and above this trough hay-racks must be provided. The troughs are held outside of the standards A, and are supported by beveled timbers C, secured on the outer side of the standards A, and increasing in width from the bottom up to the trough, and above the said troughs beveled timbers C' are secured, which increase in width from the top of the car to the top of the troughs D. The horizontal slats B are then secured to the beveled timbers C C'. The troughs are covered on top, and at the middle of the cover each trough has an opening, D', through which the animal can pass its nose and mouth into the trough. The inner sides of the troughs bulge inwardly at the middle, so that the cross-section of the trough will be greater at the middle than at the ends, as is shown in Fig. 3. Each half of the car is divided into a series of stalls by chains E, attached to the opposite standards, A, and to the chains E pieces of chain F are attached, which chains F are passed under the bellies of the animals, thus supporting the animals and preventing them from lying down.

The hay-boxes G are arranged on the roof of the car, and a passage, H, for brakemen or train-hands is formed between them. The hay-boxes have hinged covers G', which can be opened and swung outward to form a platform for rolling the hay bundles into the hay-boxes at the stations, as shown in Fig. 2. Those parts of the hay-boxes that are above the head ends of the stalls are open at the bottom, so that the hay passed into the same will pass through into mangers formed of curved manger-bars J, hung at the lower ends on hooks *a* on the standards A, and at the upper ends on hooks *b* at the lower ends of the inner surfaces of the inner sides of the hay-boxes. If horses are to be transported in the cars, the manger-bars J are raised, and are supported by the hooks *a'* and *b'*, which are at the upper end of the standard A and the upper end of the inner surface of the inner sides of the hay-boxes, respectively. A diagonal rod, K, is secured to the ceiling of the car and to a standard at the point at which the chain E is attached to the standard. A piece of canvas, L, is attached to this diagonal rod and to the ceiling and the standards, and forms a partition between the head ends of the stalls.

The tank M is located at the end of one of the hay-boxes, and is provided with a hermetically-closed cover, N, and with a pipe, O, which leads down to the trough D and projects into the same. The said pipe O is provided with a stop-cock, P. As the tank M is hermetically closed, the water can only flow from the same until the level of the water in the troughs is over the lower end of the pipe O. If the animals drink the water in the troughs and lower the level below the lower end of the pipe O, air passes up through the pipe into the tank M and permits a quantity of water to flow from the tank until the lower end of the pipe O is below water again.

The car is provided with a sliding door, Q, on each side—one for each section.

The manger-bars are also to be raised and suspended from the hooks $a'$ and $b'$ when the car is cleared for transporting freight, and packages can be placed in the mangers and hay-boxes.

The car-floor is slightly inclined from the middle toward the sides.

The central gangway, H, between the hay-boxes greatly facilitates the feeding of the cattle, and also permits the brakemen to move from one car to the other very rapidly.

Having thus described our invention, what we claim as new, and desire to secure by Letters Patent, is—

1. In a stock-car, the combination, with the standards A, of the transverse chains E and the chains F, attached to the said transverse chains, and adapted to be attached to the adjoining transverse chain, substantially as herein shown and described, whereby stalls are formed and the animals prevented from lying down, as set forth.

2. In a car, the combination, with the sides of the car, of the trough D, attached to the outer sides of the standards A, and the covering of the troughs, provided with the openings $D'$, substantially as herein shown and described, and for the purpose set forth.

3. In a car, the combination, with the sides of the car, of the troughs D, increasing in width toward the middle, and having the inner sides bulged toward the interior of the car, substantially as herein shown and described, and for the purpose set forth.

4. In a car, the combination, with the sides of the car, of the troughs D, the beveled timbers C C', attached to the outer sides of the standards, and the slats B, attached to the timbers C C', substantially as herein shown and described, and for the purpose set forth.

5. In a car, the combination, with the feed-boxes G, open at the bottom, of the manger-bars J and the hooks $a$ and $b$, substantially as herein shown and described, and for the purpose set forth.

6. The combination, with a car, of diagonal bars K, held to the top and sides, and of the canvas sheets L, held to the top and sides of the car and to the said bars K, substantially as herein shown and described, and for the purpose set forth.

HENRY RICHARDSON BOTHWELL.
JAMES HUDD STRUGNELL.

Witnesses:
  CHARLES FREDERICK SILVESTER,
  GEORGE SCOTT JONES.